March 25, 1969 S. C. BRAY 3,434,175
FOOD TURNER AND GRILL CLEANER KIT COMBINATION
Filed July 31, 1967
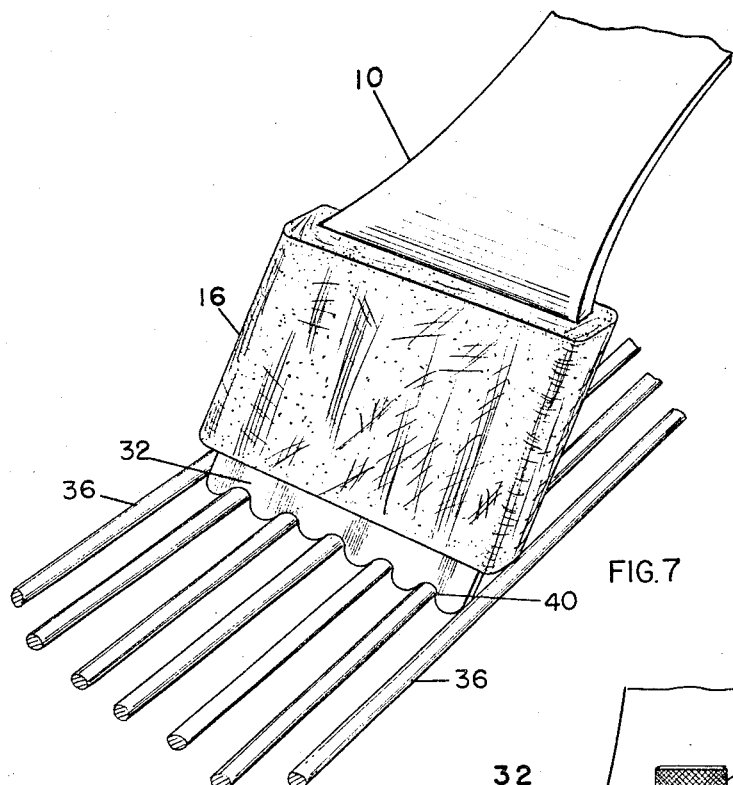
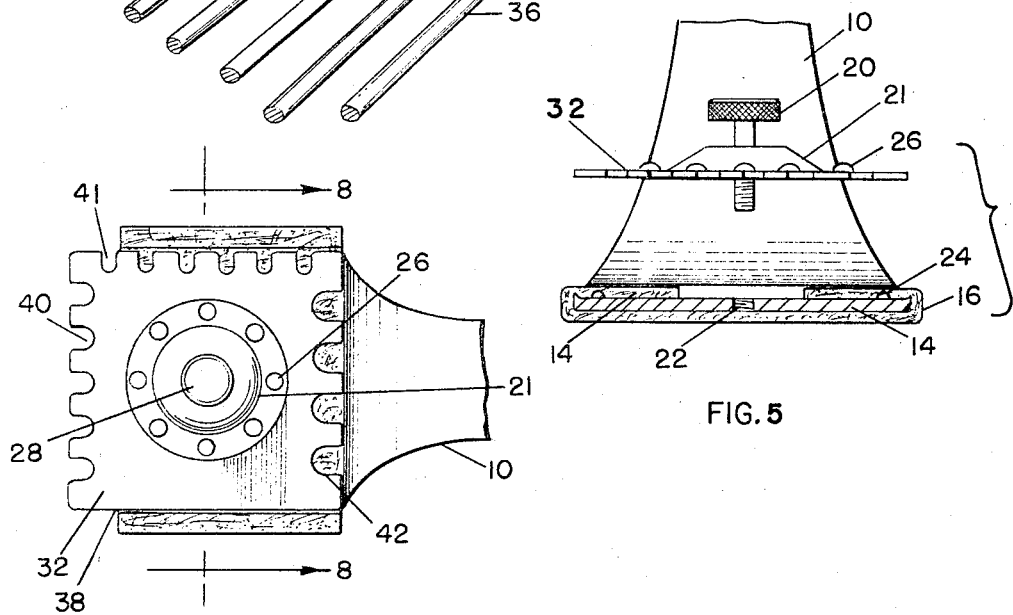
INVENTOR.
SIDNEY CROCKETT BRAY
BY
AGENT United States Patent Office 3,434,175
Patented Mar. 25, 1969

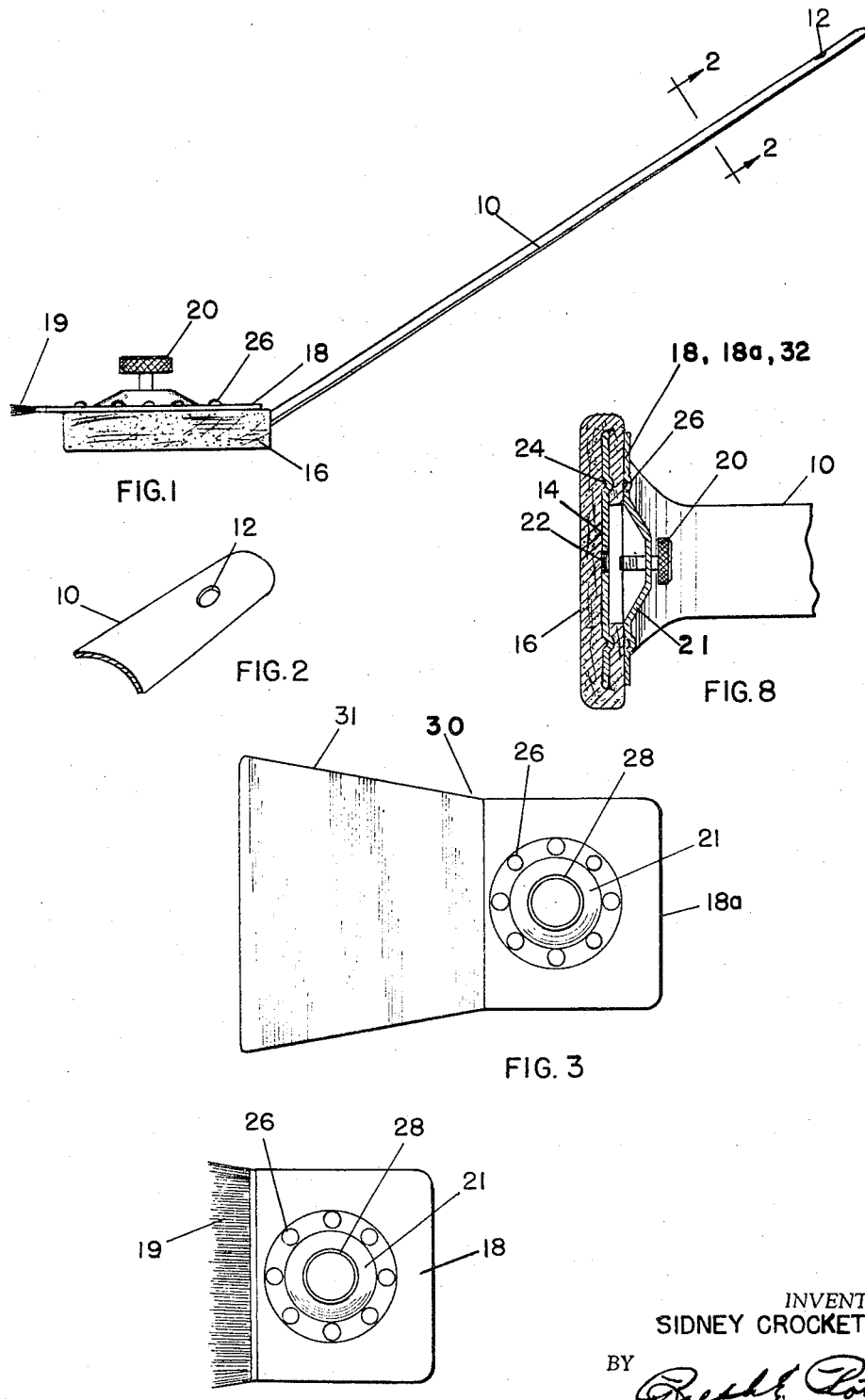

3,434,175
FOOD TURNER AND GRILL CLEANER
KIT COMBINATION
Sidney Crockett Bray, 203 E. 8th St.,
Edmond, Okla. 73034
Filed July 31, 1967, Ser. No. 657,324
Int. Cl. A47l 13/02, 13/46; A46b 5/02
U.S. Cl. 15—105                    1 Claim

ABSTRACT OF THE DISCLOSURE

A combined cleaning implement and cooking implement kit having an intermediate cleaning pad, an elongated handle and a plate-like head member having equally spaced bulbous portions thereon and extending angularly from one end of the handle, and implements having heads with bulbous portions thereon which adjustably coact by the intermediate cleaning pad with the head of the handle by a common central screw means for adjustment of the heads of said implements with respect to the head of said handle.

---

A barbecuing food handling and grill cleaning tool combination comprising a universal head and handle, a food handling turner, a brush, a cleaning impregnated scouring pad and a multiple spaced grill scraper for various spaced barbecue grills.

This invention relates in general to a food handling and grill cleaning tool combination in kit form which is cheap, dependable, compact and easily manufactured and has great utility to a restaurant, the camper, traveler and to the barbecuing of meat in a portable grill or barbecuing pit as desired.

At present there are many separate and bulky cooking and cleaning devices for use with a kitchen, or a barbecue pit, but none of these devices singularly meets the needs of a barbecue kit which is simple and compact and which has one common handle and mounting head for use with at least two different tools simultaneously as taught by applicant's new tool combination.

This invention solves the above problems by providing a new compact barbecuing food handling and grill cleaning tool combination having a common handle and mounting head for simultaneously receiving a food turner blade and a cleaning pad, for use during barbecuing of meat, and which is adaptable to receive a brush or a multi-scraper in combination with the cleaning pad for scraping and cleaning a grill after use thereof.

It is a primary object of the present invention to provide a compact and dependable multi-purpose cooking and cleaning appliance for a barbecue pit, as described, having means for simultaneously supporting a plurality of different implements or devices for various uses which may be selectively applied by the user to turn food or clean a grill of a barbecue pit during barbecuing use thereof.

Another object of the invention is to provide an appliance of the character described whose food handling and cleaning devices are removably supported thereon for easily cleaning same and replaceable when worn or for substitution thereof.

A still further object of this invention is to provide a simple universal and multi-use utility tool combination having only one handle for space saving on a cooking hearth or grill which is adaptable to the cooking operations, as well as, the scraping and cleaning of a barbecuing grill of different size openings therein after use thereof.

The foregoing and other objects and advantages of the multi-purpose food handling and cleaning appliance of the present invention will become more readily apparent to those skilled in the art from the embodiments as shown in the accompanying drawings, and from the following description.

In the drawings:

FIGURE 1 is an elevational view of the handle and head combination of the present invention having a cleaning pad and brush assembled for use thereof;

FIGURE 2 is a cross-sectional view of the handle of the present invention taken on lines 2—2 of FIGURE 1 as shown;

FIGURE 3 is a plan view of the food turner of the present invention which may be selectively assembled to the cleaning pad and handle with head as indicated in FIGURES 1, 3, 4 and 5;

FIGURE 4 is a plan view of the brush before assembly in the kit as shown in FIGURE 1;

FIGURE 5 shows an exploded view of the scraper and screw means before being fastened to the cleaning pad around the head portion of the partial handle portion of the present invention;

FIGURE 6 is a plan view of the grill scraper of FIGURE 5 assembled with the cleaning pad, all attached to the head and handle means of the present invention;

FIGURE 7 shows the assembled scraper and cleaning pad of the present invention having the scraper being applied to grill rods of a charcoal grill; and FIGURE 8 is a sectional view of FIGURE 6 taken substantially on lines 8—8 as indicated.

In the drawings like reference numerals represent like parts.

Referring in detail to the drawings, FIGURE 1 shows one assembly of the invention comprising a handle 10 of suitable material having a utility aperture 12 for hanging same on a nail or hook (not shown) when the device is not being used, as hereinafter described. Handle 10 is suitably joined to a handle support head member 14, around which is partially wrapped a scouring pad 16 which is held in place by brush head 18 and thumb screw member 20 secured by thread means 22 in head member 14.

Head member 14 has a plurality of bulbous portions 24 which align with bulbous portions 26 of brush head 18 to securely hold cleaning pad 16 in place about head 14 and between brush head 18 having bristles 19 and aperture 28 for receiving screw member 20 therethrough, as best shown in FIGURE 8.

Handle 10 has a utility aperture 12, as shown in FIGURE 2, for hanging same on a hook or nail above a cooking hearth or barbecue pit (not shown).

Referring to FIGURE 3, the food turner 30 is comprised of blade 31, an implement head 18a having a raised arcuate portion 21, for strength, having bulbous portions 26 and a central aperture 28 for receiving thumb screw 20 therethrough, as shown, for brush implement head 18 of FIGURES 4 and 1.

During the cooking portion of the barbecue operation food turner 30 of FIGURE 3 may be removed, if desired, and scraper 32 or brush head 18 selectively substituted with scouring pad 16 in place on head 14, as indicated in FIGURE 8.

After the cooking portion of the barbecue operation the food turner 30 is removed from handle head means 14 by removing thumb screw 20 from thread means 22 in head portion 14 of handle 10, and then scraper 32 of FIGURE 5, may be assembled in position on to handle head 14 by screw member 20 as shown in FIGURE 6 after which scraper 32 may be applied to grill grates 36 as shown in FIGURE 7.

Scraper blade 32, of FIGURES 5 and 6, is comprised of a straight side portion 38, for scraping the tops of a grill or the bottom of a cooking utensil, and three side portions having recessed portions 40, 41 and 42, respectively for scraping grills of different sizes and of different parallel spaced relationships. Recesses 40, 41 and 42 may have a suitable slant to the plane of scraper 32 for a more unique operation and comfort in scraping grill members 36 as shown in FIGURE 7.

If a grill has cross members then, of course, the pad 16 and brush head 18 may be used in combination for cleaning the grill.

Scouring pad 16 may be made of a heat resistant and rough plastic fibrous material, or suitable combined fibrous-like materials impregnated with a desired cleaning solvent, detergent or soap-like material which requires no water therefor during the cleaning operation, after which a cleaned grate or grill may be rinsed with clear water or merely wiped clean with a suitable commercial paper towel before being using again for another barbecuing operation.

The bristles 19 of brush head 18 may be of a suitable stiffness and of a desired material which will insure a thorough brushing and cleaning action of a grill having cross bars.

In operation, the instant new utility kit combination of this invention is conveniently adapted to different uses during barbecuing and cooking of food, and cleaning of a cooking hearth or barbecuing grill, in that, this kit may be used both as a food turner and used as a scraper-cleaner combination for scraping and cleaning of a cooking hearth or grill after use thereof.

The thumb screw 20 secures all component heads 18, 18a and 32 and cleaning mitt 16 to holder head portion 14 of handle 10 by thumb screw means 22.

The scraper blade 32 and turner head 18a both fit to holder head portion 14 with just enough space to allow for the thickness of the scouring mitt 16 to become fixedly compressed between the above implement heads and holder head 14 and the implement heads 18, 18a and 32 all protrude beyond the scouring pad 16. Recesses 40 of scraper head 32 may also be of an oval shape and slanted to the plane of the handle head 14 for ease in holding handle 10 in a proper cleaning position as shown in FIGURE 7, if desired.

Scraper head 32 provides four scraper edges 38, 40, 41 and 42 to fit different size grills with round and/or flat rods and different spacings between said grill rods.

The bulbous portions 26 and 24 of the heads 18, 18a and 32 and holder head portion 14 affixed to handle 10 may be of any number as desired.

The bristles 19 of brush head 18 may be of steel if desired. Bristles 19 are designed for use with criss-cross rods, flat or odd shaped rods for cleaning and polishing same.

Turner blade 31 connected to head 18a of this new kit combination permits a quick change from a grill scraper and cleaner to a meat turner, for hamburgers and other meats or foods on a grill 36 and may be used as a pancake turner on a suitable outdoor grill and the like.

The above new utility kit combination uniquely comprises 6 parts that make up the complete assembly for the food turner with cleaner and scraper-cleaner combination, which saves space during transportation and use of same, in comparison to many cooking and cleaning tools all having separate handles therefor.

From the foregoing it will now be seen that there is herein provided an improved food turner and grill cleaner kit combination which accomplishes all the objects of this invention, and others, including many attendant advantages of great practical utility and commercial importance.

It should be understood, of course, that the foregoing disclosure relates to only preferred embodiments of the invention and that it is intended to cover all changes and modifications of the examples of the invention herein chosen for the purposes of the disclosure, which do not constitute departures from the spirit and scope of the invention set forth in the appended claim.

I claim:

1. A combined cleaning implement and cooking implement kit comprising: an elongated handle and plate-like head member extending angularly from one end of said handle, said head member having a central opening therethrough and a plurality of bulbous portions equally spaced both angularly and radially about said opening; an implement having joined thereto a plate-like head, said head comprising a central opening and bulbous portions thereabout equal in number and spacing to the bulbous portions on said head member, said head member and said head being shaped and dimensioned to receive therebetween portions of a fibrous pad, when said head and said head member are brought into juxtaposition, so that said pad may be draped around said head member; a screw means for attaching said implement at its head to said head member at said openings; and said bulbous portions on both said handle head member and said head also serving, while still free to turn on said screw means, to angularly locate said implement relative to said handle head member by their interfitting relations and to be so held in place when the screw means is fully secured in place.

References Cited

UNITED STATES PATENTS

| | | | |
|---|---|---|---|
| 2,993,222 | 7/1961 | Laymon | 15—144 X |
| 3,045,271 | 7/1962 | Cinotti | 15—144 X |
| 3,336,703 | 8/1967 | Multer | 15—144 X |
| 421,117 | 2/1890 | Voltz | 15—236 X |
| 560,060 | 5/1896 | De Laney | 15—105 |
| 698,849 | 4/1902 | Ouellette | 15—236 X |
| 2,747,911 | 5/1956 | Kuever | 15—236 X |
| 2,824,323 | 2/1958 | Tos et al. | 15—105 |
| 2,896,242 | 7/1959 | Winch | 15—104.93 |
| 3,366,987 | 2/1968 | Giustino | 15—105 |

WALTER A. SCHEEL, *Primary Examiner.*

L. G. MACHLIN, *Assistant Examiner.*

U.S. Cl. X.R.

15—236, 114, 144, 231, 104.94